US012732405B2

(12) United States Patent
Chen et al.

(10) Patent No.: US 12,732,405 B2
(45) Date of Patent: Sep. 8, 2026

(54) CYCLIC SHIFTING FOR SOUNDING REFERENCE SIGNAL PORTS

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 567 days.

(21) Appl. No.: 18/167,708

(22) Filed: Feb. 10, 2023

(65) Prior Publication Data

US 2023/0291626 A1 Sep. 14, 2023

Related U.S. Application Data

(60) Provisional application No. 63/268,560, filed on Feb. 25, 2022.

(51) Int. Cl.
*H04L 27/26* (2006.01)
*H04L 5/00* (2006.01)

(52) U.S. Cl.
CPC ........ *H04L 27/2607* (2013.01); *H04L 5/0048* (2013.01); *H04L 27/2613* (2013.01)

(58) Field of Classification Search
CPC ............... H04L 27/2607; H04L 5/0048; H04L 27/2613; H04L 5/0023; H04L 5/0094; H04L 5/0051; H04B 1/713; H04B 7/0456; H04B 7/0404; H04J 13/0074
See application file for complete search history.

(56) References Cited

U.S. PATENT DOCUMENTS 11,588,595 B2 * 2/2023 Manolakos .......... H04B 7/0404
12,519,593 B2 * 1/2026 Nilsson ................. H04L 5/0051
2016/0095104 A1 * 3/2016 Chen ..................... H04L 5/0048 370/329

(Continued)

FOREIGN PATENT DOCUMENTS

WO WO-2013091490 A1 * 6/2013 .......... H04J 13/0074
WO WO-2020101780 A2 5/2020

(Continued)

OTHER PUBLICATIONS

E. Shin and J. Shin, "Sounding reference signal measurement in LTE system," 2016 18th International Conference on Advanced Communication Technology (ICACT), PyeongChang, Korea (South), 2016, pp. 755-758, doi (Year: 2016).*

(Continued)

*Primary Examiner* — Ayaz R Sheikh
*Assistant Examiner* — Louis Samara
(74) *Attorney, Agent, or Firm* — QUALCOMM Incorporated

(57) ABSTRACT

Various aspects of the present disclosure generally relate to wireless communication. In some aspects, a user equipment (UE) may receive a configuration that indicates one or more cyclic shift parameters or one or more comb offset parameters per sounding reference signal (SRS) port. The UE may transmit one or more SRSs based at least in part on the one or more cyclic shift parameters per SRS port. Numerous other aspects are described.

17 Claims, 14 Drawing Sheets

700

(56) References Cited

U.S. PATENT DOCUMENTS

| | | | | |
|---|---|---|---|---|
| 2019/0158171 | A1* | 5/2019 | Ren | H04B 7/0456 |
| 2019/0274155 | A1* | 9/2019 | Bhattad | H04L 5/0073 |
| 2020/0059338 | A1* | 2/2020 | Joseph | H04W 72/1273 |
| 2020/0146048 | A1* | 5/2020 | Lee | H04W 72/535 |
| 2020/0235881 | A1* | 7/2020 | Choi | H04L 5/0048 |
| 2020/0259683 | A1* | 8/2020 | Manolakos | H04L 25/0226 |
| 2020/0313815 | A1* | 10/2020 | Sridharan | H04B 7/0404 |
| 2020/0366429 | A1* | 11/2020 | Huang | H04W 28/16 |
| 2021/0036895 | A1* | 2/2021 | Huang | H04L 5/0051 |
| 2022/0173865 | A1* | 6/2022 | Maamari | H04W 72/23 |
| 2023/0188398 | A1* | 6/2023 | Alawieh | H04L 27/2613 375/262 |
| 2023/0396379 | A1* | 12/2023 | Wang | H04L 5/0048 |
| 2024/0163043 | A1* | 5/2024 | Chen | H04L 5/00 |
| 2024/0178969 | A1* | 5/2024 | Gao | H04L 5/0051 |
| 2024/0333572 | A1* | 10/2024 | Ogawa | H04L 5/0037 |

FOREIGN PATENT DOCUMENTS

| | | | | |
|---|---|---|---|---|
| WO | WO-2021229539 | A1 * | 11/2021 | H04W 16/28 |
| WO | WO-2022029330 | A1 * | 2/2022 | H04L 27/2613 |

OTHER PUBLICATIONS

International Search Report and Written Opinion—PCT/US2023/062479—ISA/EPO—Oct. 9, 2023.

Partial International Search Report—PCT/US2023/062479—ISA/EPO—Jul. 7, 2023.

* cited by examiner

600

Cluster size = 4, and 4 UEs for coherence joint transmission across multiple TRPs 900
910
Receive a configuration that indicates one or more cyclic shift parameters or one or more comb offset parameters per sounding reference signal (SRS) port
920
Transmit one or more SRSs based at least in part on the one or more cyclic shift parameters or the one or more comb offset parameters per SRS port

CYCLIC SHIFTING FOR SOUNDING REFERENCE SIGNAL PORTS

CROSS-REFERENCE TO RELATED APPLICATION

This Patent Application claims priority to U.S. Provisional Patent Application No. 63/268,560, filed on Feb. 25, 2022, entitled "CYCLIC SHIFTING FOR SOUNDING REFERENCE SIGNAL PORTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for cyclic shifting for sounding reference signal ports.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving a configuration that indicates one or more cyclic shift parameters or one or more comb offset parameters per sounding reference signal (SRS) port. The method may include transmitting one or more SRSs based at least in part on the one or more cyclic shift parameters or the one or more comb offset parameters per SRS port.

Some aspects described herein relate to a method of wireless communication performed by a network entity. The method may include transmitting a configuration that indicates one or more cyclic shift parameters or one or more comb offset parameters per SRS port. The method may include receiving one or more SRSs based at least in part on the one or more cyclic shift parameters or the one or more comb offset parameters per SRS port.

Some aspects described herein relate to a method of wireless communication performed by a UE. The method may include receiving a configuration for enabling or disabling cyclic shift hopping per SRS resource or per SRS resource set. The method may include performing cyclic shift hopping for SRSs based at least in part on the configuration.

Some aspects described herein relate to a method of wireless communication performed by a network entity. The method may include transmitting a configuration for enabling or disabling cyclic shift hopping per SRS resource or per SRS resource set. The method may include receiving SRSs according to cyclic shift hopping that is based at least in part on the configuration.

Some aspects described herein relate to a UE for wireless communication. The UE may include a memory and one or more processors coupled to the memory. The one or more processors may be configured to receive a configuration that indicates one or more cyclic shift parameters or one or more comb offset parameters per SRS port. The one or more processors may be configured to transmit one or more SRSs based at least in part on the one or more cyclic shift parameters or the one or more comb offset parameters per SRS port.

Some aspects described herein relate to a network entity for wireless communication. The network entity may include a memory and one or more processors coupled to the memory. The one or more processors may be configured to transmit a configuration that indicates one or more cyclic shift parameters or one or more comb offset parameters per SRS port. The one or more processors may be configured to receive one or more SRSs based at least in part on the one or more cyclic shift parameters or the one or more comb offset parameters per SRS port.

Some aspects described herein relate to a UE for wireless communication. The UE may include a memory and one or more processors coupled to the memory. The one or more processors may be configured to receive a configuration for enabling or disabling cyclic shift hopping per SRS resource or per SRS resource set. The one or more processors may be configured to perform cyclic shift hopping for SRSs based at least in part on the configuration.

Some aspects described herein relate to a network entity for wireless communication. The network entity may include a memory and one or more processors coupled to the memory. The one or more processors may be configured to transmit a configuration for enabling or disabling cyclic shift hopping per SRS resource or per SRS resource set. The one or more processors may be configured to receive SRSs according to cyclic shift hopping that is based at least in part on the configuration.

Some aspects described herein relate to a non-transitory computer-readable medium that stores a set of instructions for wireless communication by a UE. The set of instructions, when executed by one or more processors of the UE, may cause the UE to receive a configuration that indicates one or more cyclic shift parameters or one or more comb offset parameters per SRS port. The set of instructions, when executed by one or more processors of the UE, may cause the UE to transmit one or more SRSs based at least in part on the one or more cyclic shift parameters or the one or more comb offset parameters per SRS port.

Some aspects described herein relate to a non-transitory computer-readable medium that stores a set of instructions for wireless communication by a network entity. The set of instructions, when executed by one or more processors of the network entity, may cause the network entity to transmit a configuration that indicates one or more cyclic shift parameters or one or more comb offset parameters per SRS port. The set of instructions, when executed by one or more processors of the network entity, may cause the network entity to receive one or more SRSs based at least in part on the one or more cyclic shift parameters or the one or more comb offset parameters per SRS port.

Some aspects described herein relate to a non-transitory computer-readable medium that stores a set of instructions for wireless communication by a UE. The set of instructions, when executed by one or more processors of the UE, may cause the UE to receive a configuration for enabling or disabling cyclic shift hopping per SRS resource or per SRS resource set. The set of instructions, when executed by one or more processors of the UE, may cause the UE to perform cyclic shift hopping for SRSs based at least in part on the configuration.

Some aspects described herein relate to a non-transitory computer-readable medium that stores a set of instructions for wireless communication by a network entity. The set of instructions, when executed by one or more processors of the network entity, may cause the network entity to transmit a configuration for enabling or disabling cyclic shift hopping per SRS resource or per SRS resource set. The set of instructions, when executed by one or more processors of the network entity, may cause the network entity to receive SRSs according to cyclic shift hopping that is based at least in part on the configuration.

Some aspects described herein relate to an apparatus for wireless communication. The apparatus may include means for receiving a configuration that indicates one or more cyclic shift parameters or one or more comb offset parameters per SRS port. The apparatus may include means for transmitting one or more SRSs based at least in part on the one or more cyclic shift parameters or the one or more comb offset parameters per SRS port.

Some aspects described herein relate to an apparatus for wireless communication. The apparatus may include means for transmitting a configuration that indicates one or more cyclic shift parameters or one or more comb offset parameters per SRS port. The apparatus may include means for receiving one or more SRSs based at least in part on the one or more cyclic shift parameters or the one or more comb offset parameters per SRS port.

Some aspects described herein relate to an apparatus for wireless communication. The apparatus may include means for receiving a configuration for enabling or disabling cyclic shift hopping per SRS resource or per SRS resource set. The apparatus may include means for performing cyclic shift hopping for SRSs based at least in part on the configuration.

Some aspects described herein relate to an apparatus for wireless communication. The apparatus may include means for transmitting a configuration for enabling or disabling cyclic shift hopping per SRS resource or per SRS resource set. The apparatus may include means for receiving SRSs according to cyclic shift hopping that is based at least in part on the configuration.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
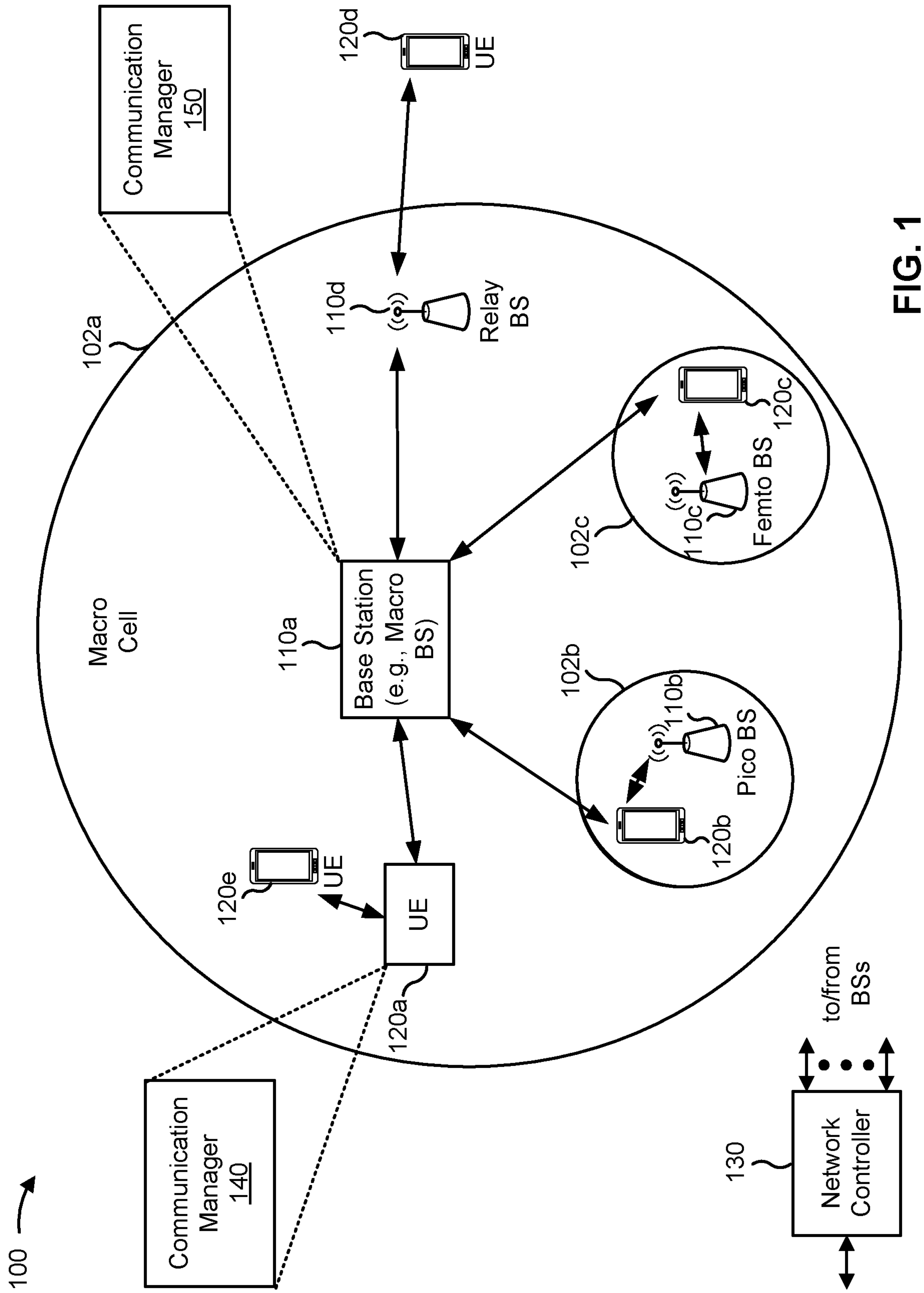
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include a user equipment (UE) 120 or multiple UEs 120 (shown as a UE 120*a*, a UE 120*b*, a UE 120*c*, a UE 120*d*, and a UE 120*e*). The wireless network 100 may also include one or more network entities, such as base stations 110 (shown as a BS 110*a*, a BS 110*b*, a BS 110*c*, and a BS 110*d*), and/or other network entities. A base station 110 is a network entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network entities in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is a network entity that can receive a transmission of data from an upstream station (e.g., a network entity or a UE 120) and send a transmission of the data to a downstream station (e.g., a UE 120 or a network entity). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network with network entities that include different types of BSs, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set network entities and may provide coordination and control for these network entities. The network controller 130 may communicate with the base stations 110 via a backhaul communication link. The network entities may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network entity, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network entity as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a configuration that indicates one or more cyclic shift parameters or one or more comb offset parameters per sounding reference signal (SRS) port. The communication manager 140 may transmit one or more SRSs based at least in part on the one or more cyclic shift parameters or the one or more comb offset parameters per SRS port.

In some aspects, the communication manager 140 may receive a configuration for enabling or disabling cyclic shift hopping per SRS resource or per SRS resource set. The communication manager 140 may perform cyclic shift hopping for SRSs based at least in part on the configuration. Additionally, or alternatively, the communication manager 140 may perform one or more other operations described herein.

In some aspects, the network entity may include a communication manager 150. As described in more detail elsewhere herein, the communication manager 150 may transmit a configuration that indicates one or more cyclic shift parameters or one or more comb offset parameters per SRS port. The communication manager 150 may receive one or more SRSs based at least in part on the one or more cyclic shift parameters or the one or more comb offset parameters per SRS port.

In some aspects, the communication manager 150 may transmit a configuration for enabling or disabling cyclic shift hopping per SRS resource or per SRS resource set. The communication manager 150 may receive SRSs according to cyclic shift hopping that is based at least in part on the configuration. Additionally, or alternatively, the communication manager 150 may perform one or more other operations described herein.

As indicated above, FIG. 1 is provided as an example. Other examples may differ from what is described with regard to FIG. 1.

Figure 2:
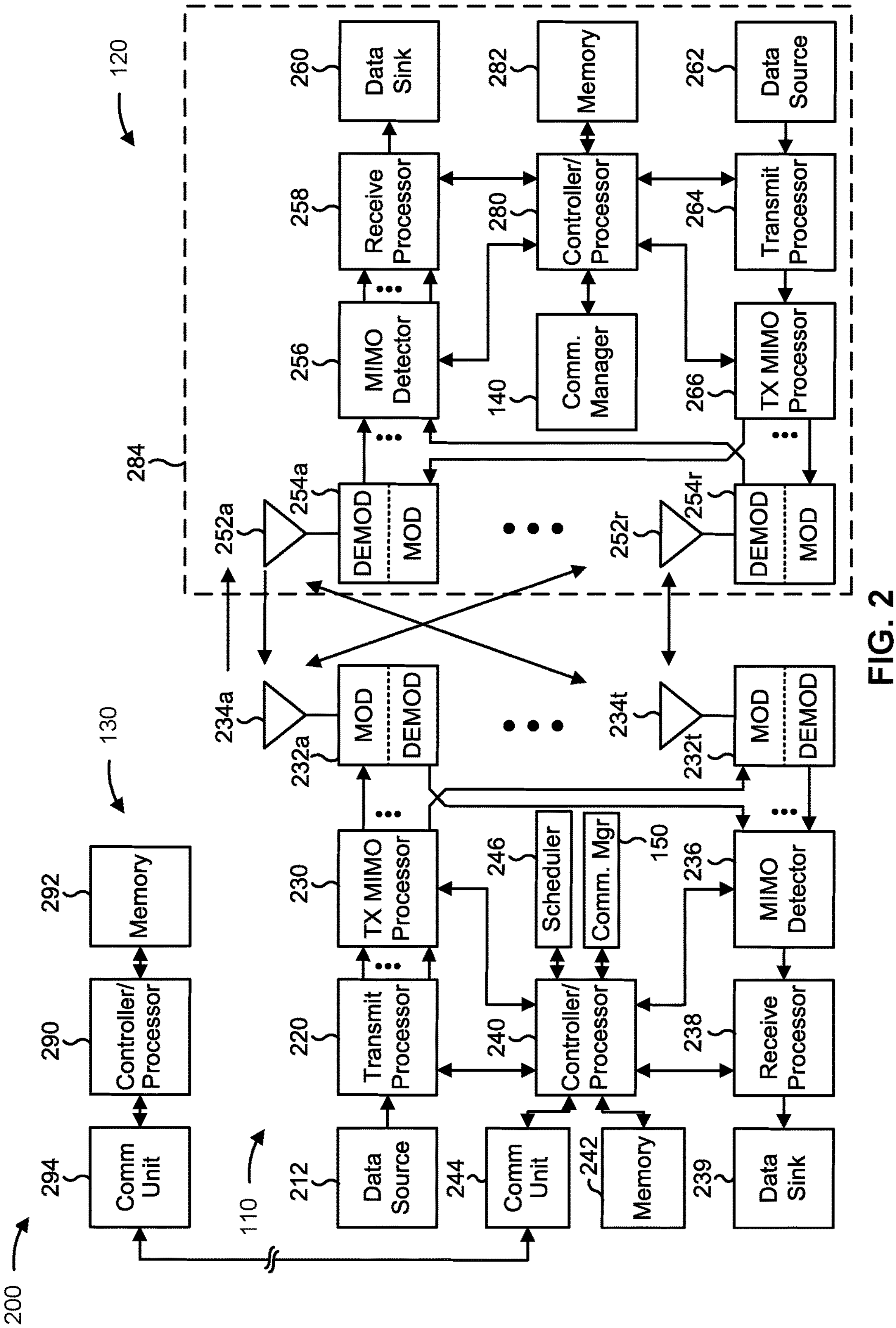
FIG. 2 is a diagram illustrating an example of a network entity in communication with a user equipment (UE) in a wireless network, in accordance with the present disclosure.

FIG. 2 is a diagram illustrating an example 200 of a network entity (e.g., base station 110) in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network entity via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network entity. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-14).

At the network entity (e.g., base station 110), the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network entity may include a communication unit 244 and may communicate with the network controller 130 via the communication unit 244. The network entity may include a scheduler 246 to schedule one or more UEs 120 for downlink and/or uplink communications. In some examples, the modem 232 of the network entity may include a modulator and a demodulator. In some examples, the network entity includes a transceiver. The transceiver may include any combination of the antenna (s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-14).

A controller/processor of a network entity, (e.g., the controller/processor 240 of the base station 110), the controller/processor 280 of the UE 120, and/or any other component(s) of FIG. 2 may perform one or more techniques associated with cyclic shift parameters and comb offset parameters per SRS port and/or cyclic shift hopping for SRS, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, process 1100 of FIG. 11, process 1200 of FIG. 12, and/or other processes as described herein. The memory 242 and the memory 282 may store data and program codes for the network entity and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network entity and/or the UE 120, may cause the one or more processors, the UE 120, and/or the network entity to perform or direct operations of, for example, process 900 of FIG. 9, process 1000 of FIG. 10, process 1100 of FIG. 11, process 1200 of FIG. 12, and/or other processes as described herein. In some examples, executing instructions may include running the instructions, converting the instructions, compiling the instructions, and/or interpreting the instructions, among other examples.

In some aspects, the UE 120 includes means for receiving a configuration that indicates one or more cyclic shift parameters or one or more comb offset parameters per SRS port; and/or means for transmitting one or more SRSs based at least in part on the one or more cyclic shift parameters or the one or more comb offset parameters per SRS port. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving a configuration for enabling or disabling cyclic shift hopping per SRS resource or per SRS resource set; and/or means for performing cyclic shift hopping for SRSs based at least in part on the configuration.

In some aspects, the network entity includes means for transmitting a configuration that indicates one or more cyclic shift parameters or one or more comb offset parameters per SRS port; and/or means for receiving one or more SRSs based at least in part on the one or more cyclic shift parameters or the one or more comb offset parameters per SRS port. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the network entity includes means for transmitting a configuration for enabling or disabling cyclic shift hopping per SRS resource or per SRS resource set; and/or means for receiving SRSs according to cyclic shift hopping that is based at least in part on the configuration.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
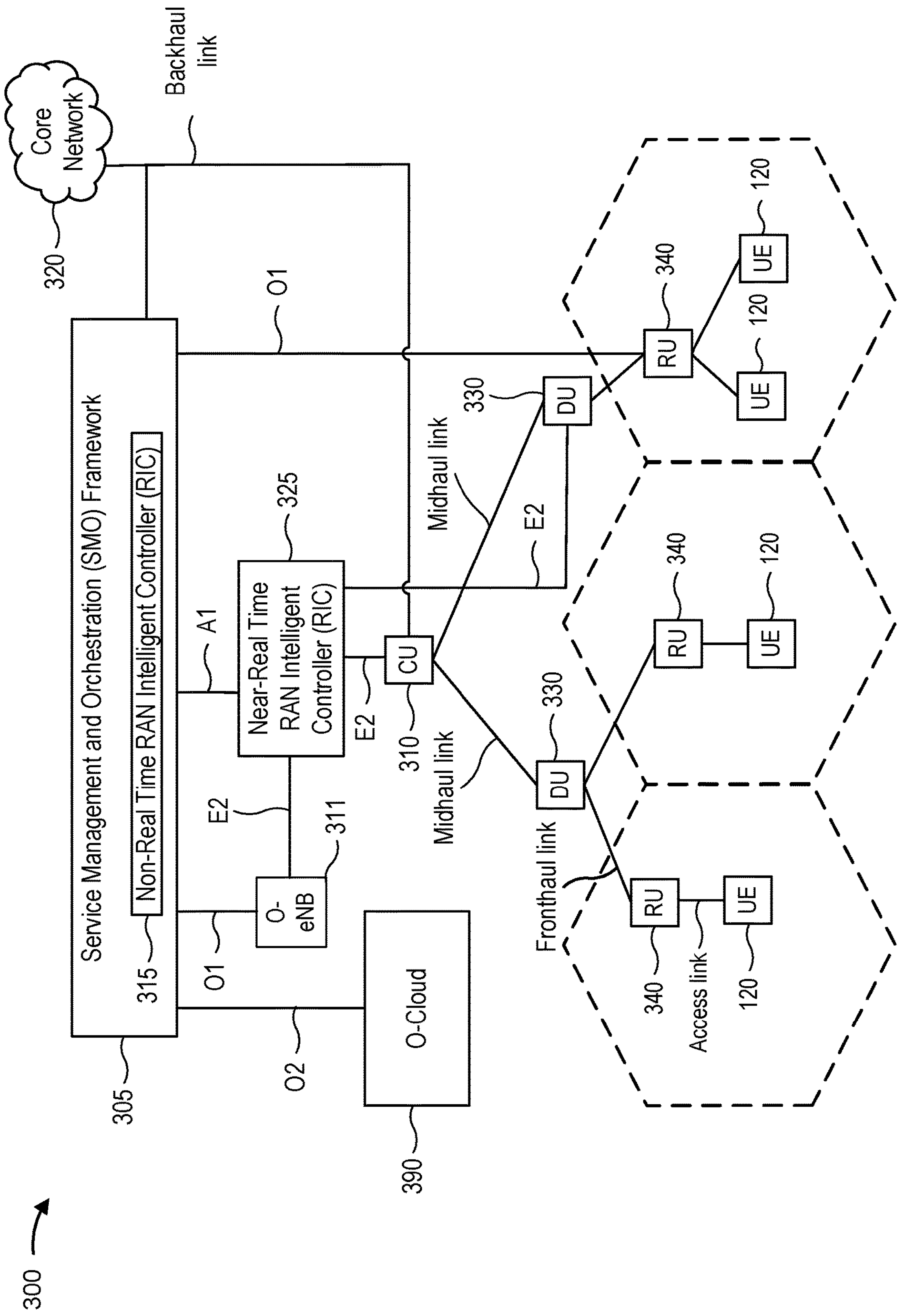
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The fronthaul link, the midhaul link, and the backhaul link may be generally referred to as “communication links.” The RUs 340 may communicate with respective UEs 120 via one or more RF access links. In some aspects, the UE 120 may be simultaneously served by multiple RUs 340. The DUs 330 and the RUs 340 may also be referred to as “O-RAN DUS (O-DUs”) and “O-RAN RUs (O-RUs)”, respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via 01) or via creation of RAN management policies (such as A1 policies).

As indicated above, FIG. 3 is provided as an example. Other examples may differ from what is described with regard to FIG. 3.

Figure 4:
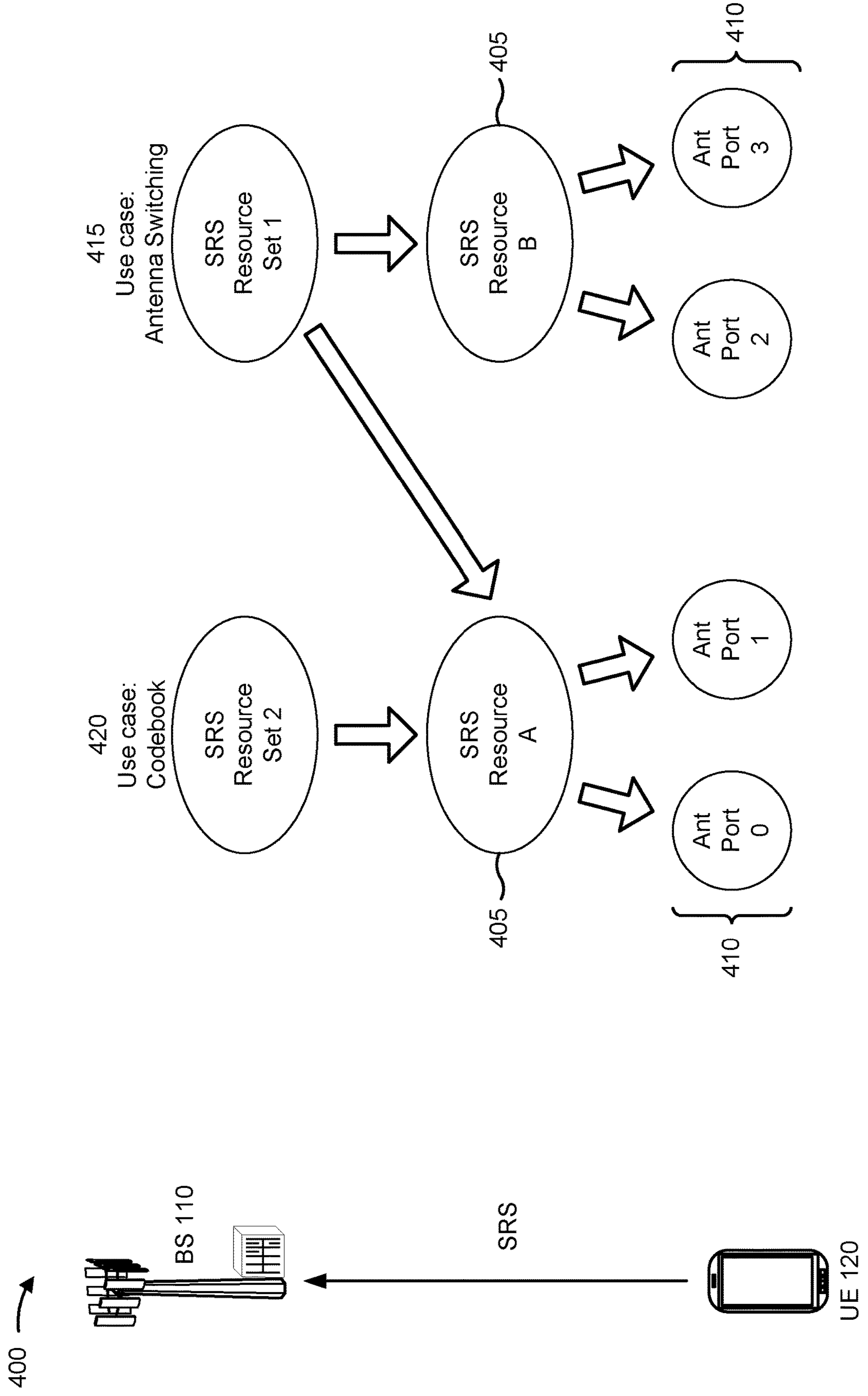
FIG. 4 is a diagram illustrating an example of sounding reference signal (SRS) resource sets, in accordance with the present disclosure.

FIG. 4 is a diagram illustrating an example 400 of SRS resource sets, in accordance with the present disclosure.

An uplink channel may include a physical uplink control channel (PUCCH) that carries uplink control information (UCI) or a physical uplink shared channel (PUSCH) that carries uplink data, among other examples. The uplink channel may also carry an uplink reference signal, such as a sounding reference signal (SRS). An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink channel state information (CSI) acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 405, an SRS resource set may include one or more resources (e.g., shown as SRS resources), which may include time resources (e.g., a slot a symbols, a periodicity) and/or frequency resources (e.g., a resource block (RB)).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120).

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120. For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications. An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using downlink control information (DCI) or a medium access control (MAC) control element (CE) (MAC CE)). An aperiodic SRS resource may be triggered dynamically, such as via DCI (e.g., UE-specific DCI or group common DCI).

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where $X \leq 4$). In some aspects, each of the X SRS ports may mapped to a corresponding symbol of the SRS resource and used for transmission of an SRS in that symbol.

As shown in FIG. 4, in some aspects, different SRS resource sets indicated to the UE 120 (e.g., having different use cases) may overlap (e.g., in time and/or in frequency, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 4 is provided as an example. Other examples may differ from what is described with regard to FIG. 4.

Figure 5:
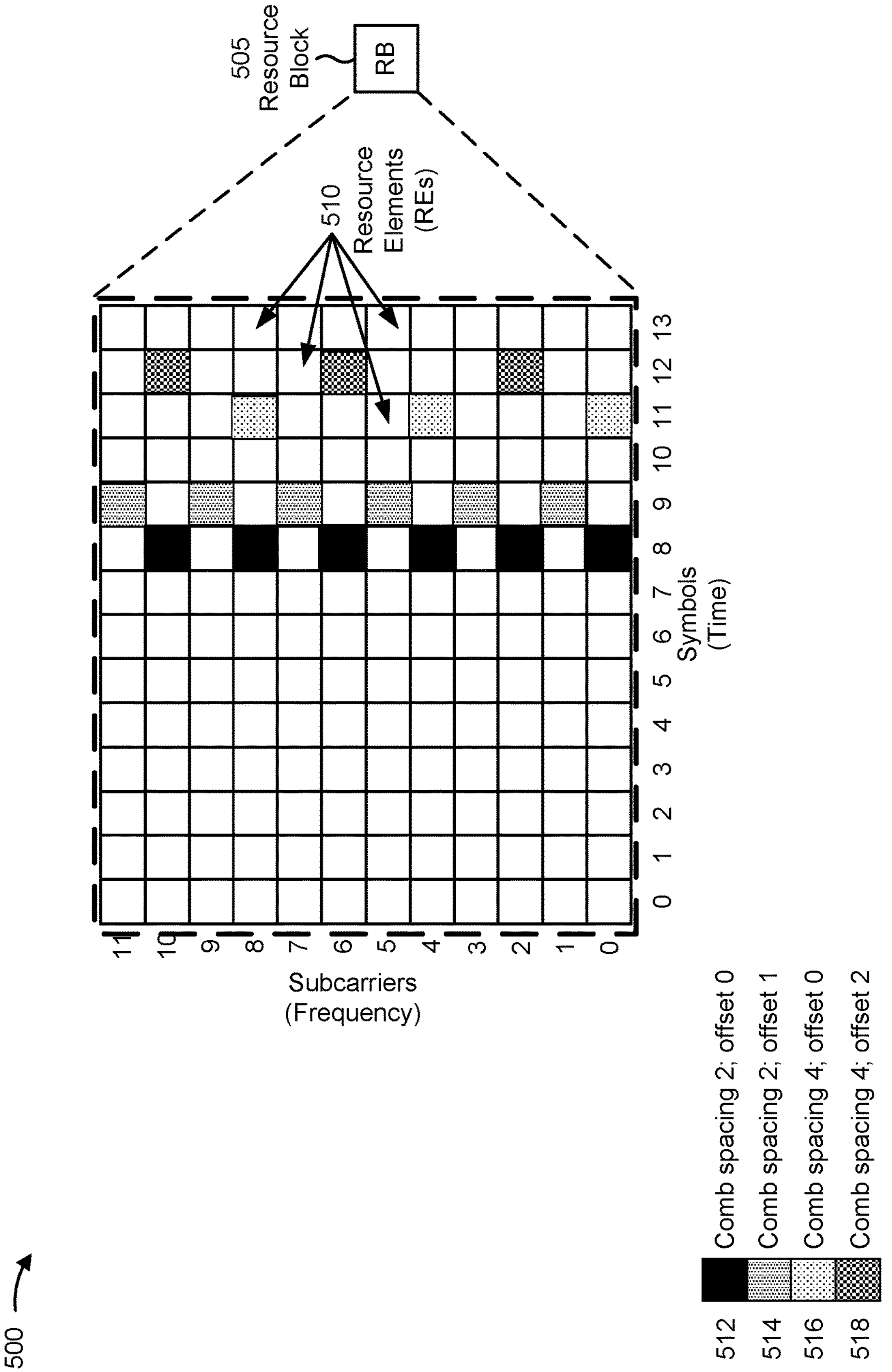
FIG. 5 is a diagram illustrating an example of a comb spacing and comb offsets slot format, in accordance with the present disclosure.

FIG. 5 is a diagram illustrating an example 500 of a comb spacing and comb offsets slot format, in accordance with the present disclosure. Time-frequency resources in a radio access network may be partitioned into RBs, sometimes referred to as physical resource blocks (PRBs). Example 500 shows an RB 505 that may include a set of subcarriers (e.g., 12 subcarriers) and a set of symbols (e.g., 14 symbols) that are schedulable by a base station 110 as a unit. In some aspects, an RB 505 may include a set of subcarriers in a single slot. As shown, a single time-frequency resource included in an RB 505 may be referred to as a resource element (RE) 510. An RE 510 may include a single subcarrier (e.g., in frequency) and a single symbol (e.g., in time). A symbol may be referred to as an OFDM symbol. An RE 510 may be used to transmit one modulated symbol, which may be a real value or a complex value.

In some telecommunication systems (e.g., NR), RBs 505 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some aspects, the link direction for a slot may be dynamically configured.

SRSs may be transmitted at different REs according to a comb pattern. A comb pattern may include a comb spacing, according to which SRSs may be spaced apart. Example 500 shows a comb spacing $K_{TC}$ that can be configured as 2, 4, or 8 REs per SRS resource. SRS comb pattern 512 and SRS comb pattern 514 show a comb spacing of 2 REs in an OFDM symbol. SRS comb pattern 516 and SRS comb pattern 518 show a comb spacing of 4 REs in an OFDM symbol.

A comb pattern may also have a comb offset that indicates a shift of where the comb spacing starts (starting RE for an SRS). Example 500 shows a comb offset $\bar{K}_{TC}$ that can be configured as 0, 1, . . . , $K_{TC}-1$ per SRS resource. SRS comb pattern 514 has an offset of 1 and starts at subcarrier 1 rather than subcarrier 0. SRS comb pattern 518 has an offset of 2 and starts at subcarrier 2 rather than subcarrier 0.

A cyclic shift for an SRS delays a starting time reference for an SRS, which may be a different time reference than for another SRS. A UE may transmit an SRS with a cyclic shift $$n_{SRS}^{cs}$$

that can be configured as 0, 1, . . . , $$n_{SRS}^{cs,max}$$

−1 per SKS resource. The cyclic shift may start with the first SRS port if the SRS resource is configured with more than one SRS port. The maximum quantity of cyclic shifts $$n_{SRS}^{cs,max}$$

depends on the comb spacing. For example, the maximum quantity of cyclic shifts $$n_{SRS}^{cs,max}$$

for a comb spacing of 2 may be 8, the maximum quantity of cyclic shifts $$n_{SRS}^{cs,max}$$

for a comb spacing of 4 may be 12, and the maximum quantity of cyclic shifts $$n_{SRS}^{cs,max}$$

for a comb spacing of 8 may be 6.

A transmission of an SRS with a cyclic shift for a base sequence may be represented as $e^{j\alpha_i n}\bar{r}_{u,v}(n)$, where $\alpha_i$ is the cyclic shift for SRS transmission index i, $\bar{r}_{u,v}(n)$ is the base sequence for n (quantity of RBs×quantity of REs/comb spacing $K_{TC}$), u is a group identifier (ID), and v is a sequential value ID. Here j is the imaginary unit, which is used to represent a complex number, for example, a+bj, where a and b are real numbers. $e^{jx}$ is a complex exponential function (a different form to represent a complex number cos x+j sin x). The cyclic shift $\alpha_i$ may be $$2\pi\frac{n_{SRS}^{cs,i}}{n_{SRS}^{cs,max}},$$

where $$n_{SRS}^{cs,i}$$

is $$\left(n_{SRS}^{cs} + \frac{n_{SRS}^{cs,max}(p_i - 1000)}{N_{ap}^{SRS}}\right) \bmod n_{SRS}^{cs,max},\ n_{SRS}^{cs}$$

is RRC-configured, $p_i$ is an antenna port number (starting from 1000), and $$N_{ap}^{SRS}$$

is the quantity of STS ports.

Different cyclic shifts of the same base sequence are expected to be orthogonal, as long as the cyclic shift spacing does not become too small relative to the delay spread of the channel (difference between time of arrival of the earliest multi-path component and time of arrival of the latest multi-path component). Different cyclic shifts may be used for different SRS ports (in scenarios where an SRS resource has more than one SRS port) or for different SRS resources (either from the same UE or from different UEs). This may help ensure mutual orthogonality among all SRS ports of a given SRS resource, or among different SRS resources (of the same UE or of different UEs).

Even though different cyclic shifts (of the same base sequence) are theoretically orthogonal, in general, the larger the cyclic shift spacing between two SRS ports or SRS resources, the more resilient the SRS may be against a large delay spread and/or other implementation issues. Currently, for a given SRS resource with multiple ports, cyclic shifts are evenly distributed among the SRS ports, where the cyclic shift of the first port is RRC-configured for the SRS resource and represented as $$d_0 = n_{SRS}^{cs}.$$

For 2 ports, the assigned cyclic shifts may be $(d_0+(0, 4))$mod 8 for a comb spacing of 2, $(d_0+(0, 6))$mod 12 for a comb spacing of 4, and $(d_0+(0, 3))$mod 6 for a comb spacing of 8. For 4 ports, the assigned cyclic shifts may be $(d_0+(0, 2, 4, 6))$mod 8 for a comb spacing of 2, $(d_0+(0, 3, 6, 9))$mod 12 for a comb spacing of 4, and $(d_0+(0,3))$mod 6 for a comb spacing of 8 (ports (0, 2) and (1, 3) have the same cyclic shift but different comb offsets).

Given that only a subset of the maximum quantity of cyclic shifts is used for an SRS resource, other cyclic shifts may be used for other SRS resources (for the same UE or for different UEs). The maximum quantity of SRS resources that may be multiplexed on the same comb using different cyclic shifts of the same base sequence may be: for a comb spacing of 2, 8 for 1 antenna port, 4 for 2 antenna ports, or 2 for 4 antenna ports; for a comb spacing of 4, 12 for 1 antenna port, 6 for 2 antenna ports, or 3 for 4 antenna ports; and for a comb spacing of 8, 6 for 1 antenna port, 3 for 2 antenna ports, or 3 for 4 antenna ports (occupying two combs).

As indicated above, FIG. 5 is provided as an example. Other examples may differ from what is described with respect to FIG. 5.

Figure 6:
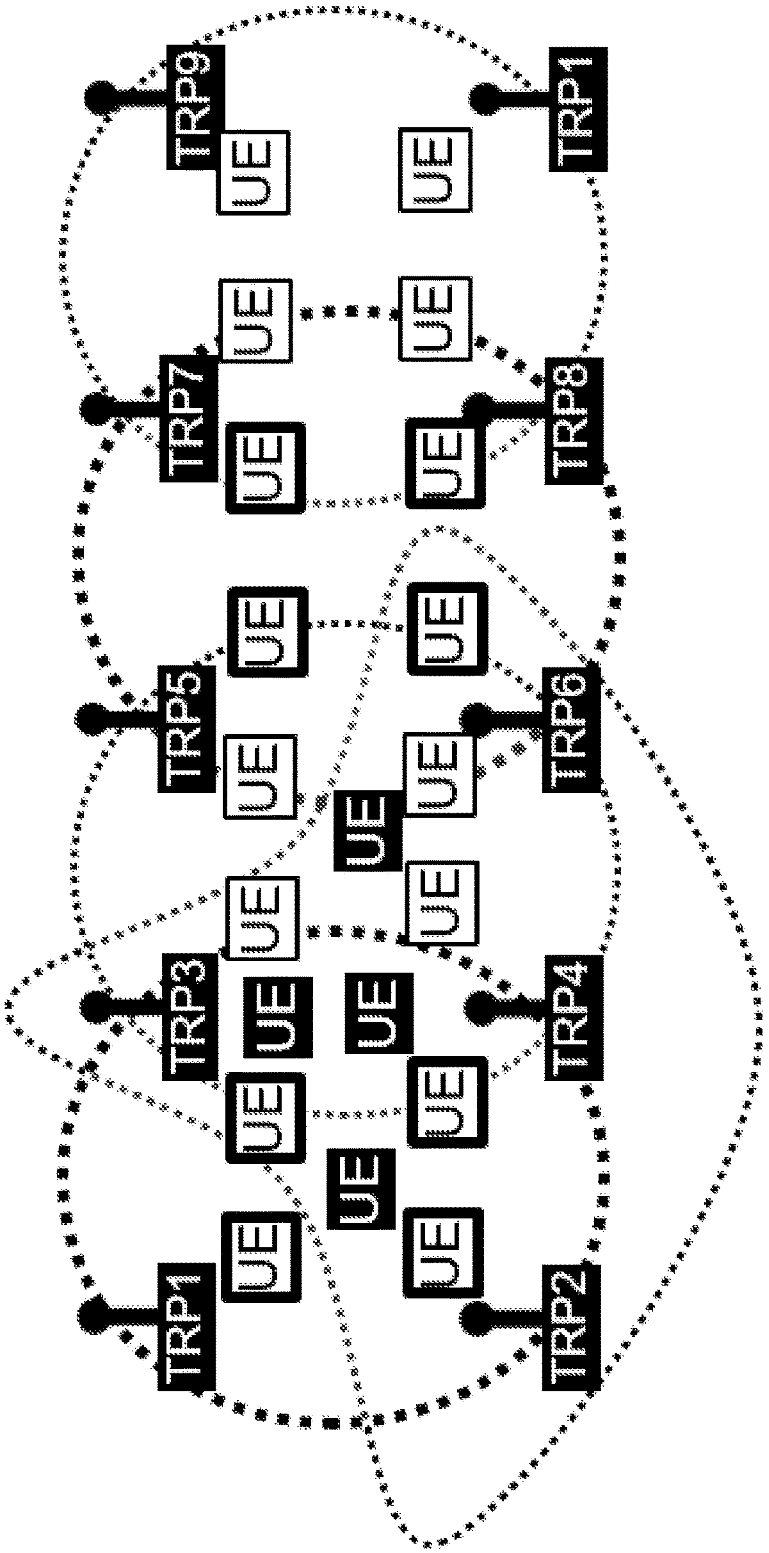
FIG. 6 is a diagram illustrating an example of multiple transmit receive points that receive SRSs, in accordance with the present disclosure.

FIG. 6 is a diagram illustrating an example 600 of multiple TRPs that receive SRSs, in accordance with the present disclosure.

Example 600 shows clusters of 4 UEs that may each transmit an SRS to one of multiple TRPs. Coherent joint transmission (CJT) may involve beam-forming where the beam-forming antennas are not co-located but correspond to different TRPs. There may be SRS interference across the different UEs for CJT across the multiple TRPs, and any enhancements to address the SRS interference are expected to reuse existing SRS comb patterns. Example 600 shows that multiple TRPs may expect to receive an SRS from a given UE. For a large number of UEs, multiple UEs may need to send an SRS on the same OFDM symbols.

To account for SRS interference, a network entity may carefully assign comb offsets and cyclic shifts. However, it is not currently possible to configure a comb offset and a cyclic shift per SRS port in a given SRS resource. Rather, one comb offset and one comb cyclic shift are configured for an entire SRS resource. Cyclic shifts are evenly distributed among the SRS ports for the SRS resource. There is currently no flexibility to configure a comb offset or a cyclic shift for different SRS ports of an SRS resource. Furthermore, interference randomization may involve hopping across different cyclic shifts. However, cyclic shift hopping is not currently possible for SRS. Group/sequence hopping can only occur across different base sequences.

In other words, different SRS ports are transmitted on the same REs (same comb offset) with exceptions (for 4 ports) that are not very flexible. For example, for a comb spacing of 4 with 12 cyclic shifts involving a first UE with 2 SRS ports and a second UE with 2 SRS ports, the first UE may be assigned cyclic shifts {0, 6} and the second UE may be assigned cyclic shifts {2, 8}. However, it is not possible to assign cyclic shifts {0, 2} to the first UE and cyclic shifts {6, 8} to the second UE. In another example, for a comb spacing of 4 with 12 cyclic shifts involving a first UE with 4 SRS ports and a second UE with 2 SRS ports, the first UE may be assigned cyclic shifts {0, 3, 6, 9} and the second UE may be assigned cyclic shifts {2, 8}. However, it is not possible to assign cyclic shifts {0, 1, 2, 3} to the first UE and cyclic shifts {7, 8} to the second UE (to maximize the inter-UE cyclic shift separation). The lack of flexibility in assigning cyclic shifts and comb spacing to SRS ports may cause some SRS transmissions to be degraded and retransmitted due to SRS interference. This may consume additional processing resources and signaling resources.

As indicated above, FIG. 6 is provided as an example. Other examples may differ from what is described with regard to FIG. 6.

Figure 7:
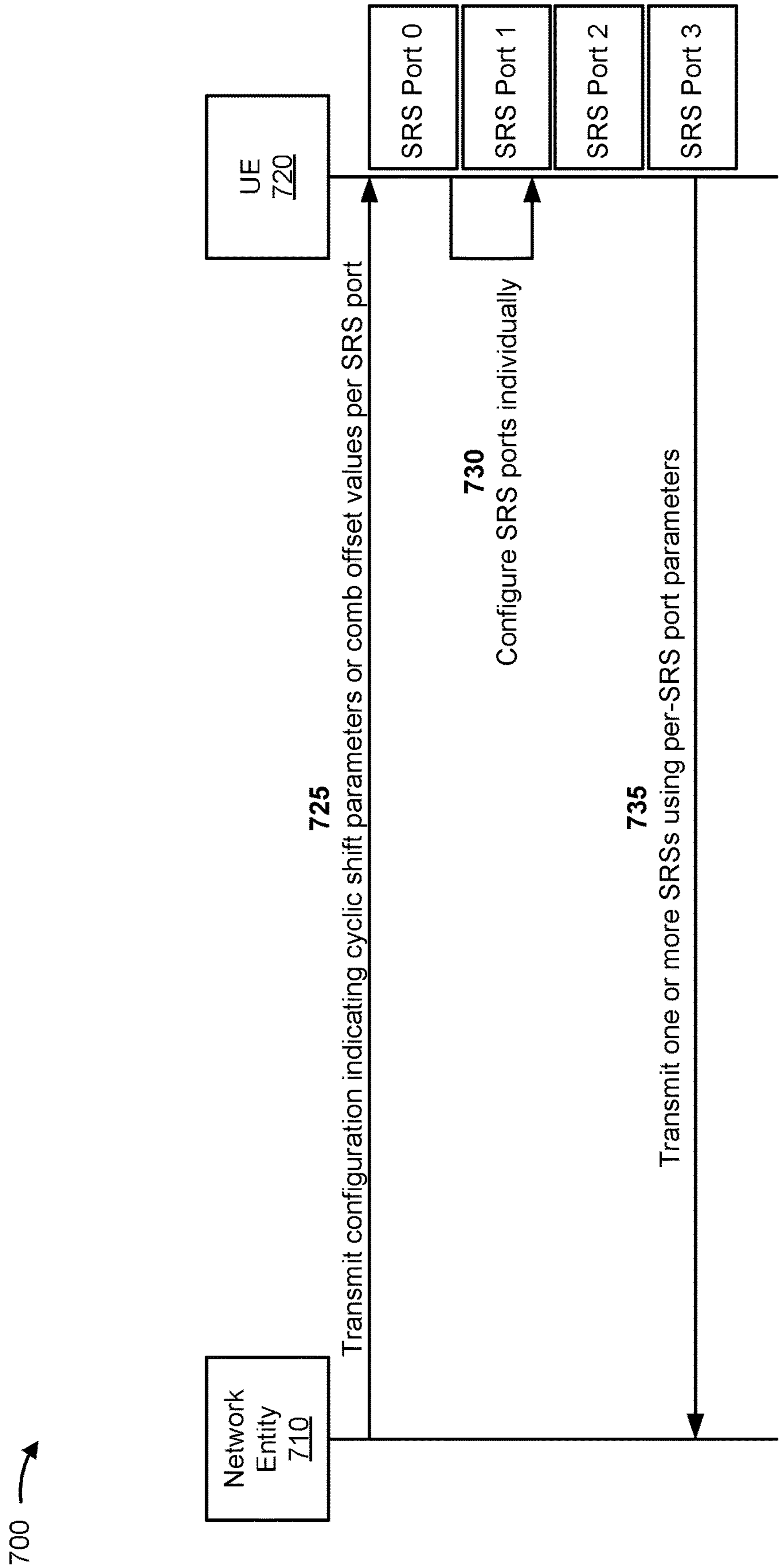
FIG. 7 is a diagram illustrating an example associated with configuring cyclic shift parameters and comb offsets values per SRS port, in accordance with the present disclosure.

FIG. 7 is a diagram illustrating an example 700 associated with configuring cyclic shift parameters and comb offsets values per SRS port, in accordance with the present disclosure. As shown in FIG. 7, a network entity 710 (e.g., base station 110) and a UE 720 (e.g., a UE 120) may communicate with one another.

According to various aspects described herein, a network entity may configure a UE with cycle shift parameters and/or comb offset parameters per SRS port for a given SRS resource. That is, cyclic shift parameters and/or comb offset parameters may be specific to each individual SRS port, whether the parameters are configured for one SRS port, for each of some of the SRS ports of the UE, or for each of all of the SRS ports of the UE. By configuring cyclic shift parameters and/or comb offset parameters on a per-SRS-port basis (rather than per SRS resource), the UE may more accurately transmit SRSs to multiple TRPs and more successfully avoid SRS interference. By improving SRS transmissions and by better avoiding SRS interference, the network entity and the UE may conserve processing resources and signaling resources.

Example 700 shows an example per-SRS-port configuration. The UE 720 may have multiple SRS ports, such as SRS Ports 0-3. As shown by reference number 725, the network entity 710 may transmit a configuration that indicates cyclic shift parameters and/or comb offset parameters per SRS port. In some aspects, the one or more cyclic shift parameters per SRS port may include antenna port cyclic shift values that correspond to multiple SRS ports. For example, the configuration may indicate $N_{ap}$ cyclic shift values corresponding to each of $N_{ap}$ SRS ports. For a first SRS port (e.g., Port 0), a shift spacing value $d_0$ may be $$n_{SRS}^{cs},$$

and $N_{ap}-1$ additional shift spacing values may be used for the other SRS ports.

In some aspects, the configuration may indicate a cyclic shift spacing across consecutive ports. For example, with 4 ports and a cyclic shift spacing of 1, the configuration may indicate that the cyclic shift spacing is $(d_0+\{0,1,2,3\})\bmod 12$ (for a comb spacing of 4). With a cyclic shift spacing 2, the cyclic shift spacing may be $(d_0+\{0,2,4,6\})\bmod 12$. Furthermore, the configuration may indicate that the cyclic shift values associated with the cyclic spacing are sequential or evenly distributed. Sequential values may correspond to a cyclic shift spacing of 1.

In some aspects, the configuration may indicate one or more comb offset parameters per SRS port for an SRS resource with multiple SRS ports. That is, the configuration may indicate a comb offset value for each SRS port. This makes it possible for the network entity 710 to use different dimensions to ensure orthogonality for more flexibility. For example, the network entity 710 may assign the same cyclic shift (e.g., cyclic shift spacing 0) but with different comb offsets for multiple SRS ports. In some aspects, the configuration may explicitly indicate $N_{ap}$ comb offset values corresponding to $N_{ap}$ SRS ports. The UE 720 may apply the existing comb offset $\bar{k}_{TC}$ to the first SRS port, and $N_{ap}-1$ additional comb offsets may be used for the other SRS ports.

In some aspects, the configuration may indicate a comb offset spacing across consecutive SRS ports. For example, with 4 SRS ports and a comb offset spacing of 1, the comb offset may be $(\bar{k}_{TC}+\{0,1,2,3\})\bmod 4$ (for a comb spacing of 4). With a comb offset spacing of 0, the comb offset may be $(\bar{k}_{TC}+\{0,0,0,0\})\bmod 4$. Instead of indicating the comb offset per SRS port, the configuration may indicate a comb offset per group of multiple SRS ports. For example, there may be one comb offset for SRS ports {1000, 1002} and another comb offset for SRS ports {1001, 1003}.

As shown by reference number 730, the UE 720 may configure the SRS ports individually based at least in part on the configuration. As shown by reference number 735, the UE 720 may transmit SRSs from the SRS ports using the per-SRS-port parameters.

As indicated above, FIG. 7 is provided as an example. Other examples may differ from what is described with respect to FIG. 7.

Figure 8:
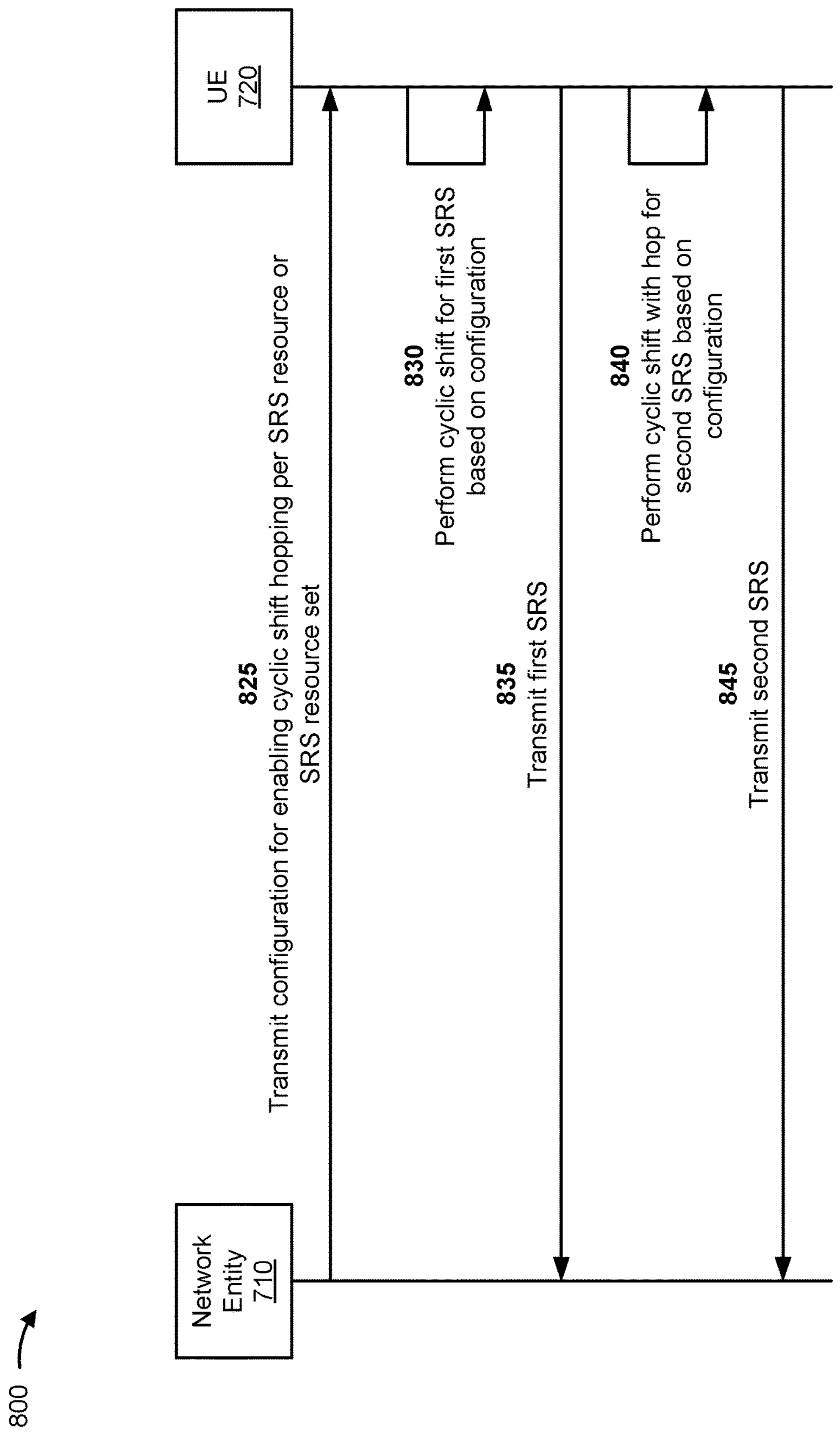
FIG. 8 is a diagram illustrating an example associated with configuring cyclic shift parameters and comb offsets values per SRS port, in accordance with the present disclosure.

FIG. 8 is a diagram illustrating an example 800 associated with configuring cyclic shift hopping for SRS, in accordance with the present disclosure. Example 800 shows the network entity 710 and the UE 720.

Currently, group/sequence hopping may be across different base sequences r(u, v), and cyclic shift hopping is supported for PUCCH. The cyclic shift α may vary as a function of slot and symbol number. For example, the cyclic shift α may be represented by $$\alpha_i = \frac{2\pi}{n_{sc}^{RB}}\left(\left(m_0 + m_{cs} + m_{int} + n_{cs}\left(n_{scs.f}^{\mu},\ l + l'\right)\right) \bmod N_{sc}^{RB}\right),$$

where $m_0$ is an initial cyclic shift that is RRC configured per PUCCH resource, $$n_{sc}^{RB}$$

is a quantity of cyclic shifts for PUCCH (e.g., 12), $$n_{s.f}^{\mu}$$

is a slot number, l+l' is a slot number within a slot, and $$n_{cs}\left(n_{scs.f}^{\mu}, l\right) = \sum_{m=0}^{7} 2^m c\left(8N_{symb}^{slot} n_{s.f}^{\mu} + 8l + m\right).$$

However, cyclic shift hopping is not currently possible for SRS.

According to various aspects described herein, the network entity 710 may configure UE 720 with cyclic shift hopping for SRS transmission. SRS transmission may benefit from cyclic shift hopping, especially for interference randomization. As shown by reference number 825, the network entity 710 may transmit a configuration for enabling cyclic shift hopping per SRS resource or per SRS resource set. A configuration of a cyclic shift $$n_{SRS}^{cs}$$

may be used as an offset for the cyclic shift hopping. The cyclic shift in an lth OFDM symbol of an SRS resource for an ith SRS port may be represented as $\alpha_{i,l}$ in an SRS transmission $e^{j\alpha_{i,l}n}\bar{r}_{u,v}(n)$. For the first SRS port (i=0), the UE 720 may determine the cyclic shift as a function of an OFDM symbol number ($l_0$+l) (cyclic shift determined per OFDM symbol), a slot number within a radio frame $$n_{s,f}^{\mu},$$

the configured cyclic shift $$n_{SRS}^{cs}$$

(e.g., as an initial value/offset for the cyclic shift hopping), a maximum quantity of cyclic shifts $$n_{SRS}^{cs,max}$$

(which is a function or a comb spacing), and a pseudo-random sequence c(i) initialized by $$c_{init} = n_{ID}^{SRS}$$

(SRS sequence identity) at the beginning of each radio frame. For example, $$\alpha_{0,l} = \frac{2\pi}{n_{SRS}^{cs,max}}\left(\left(n_{SRS}^{cs} + \sum_{m=0}^{7} c\left(8\cdot\left(n_{s,f}^{\mu} N_{symb}^{slot} + l_0 + l\right) + m\right)\cdot 2^m\right) \bmod n_{SRS}^{cs,max}\right).$$

The UE 720 may determine cyclic shifts for the remaining SRS antenna ports (in case the SRS resource is configured with more than one SRS port) based on the cyclic shift $\alpha_{0,l}$ of the first SRS port and even/uniform distribution of cyclic shifts among the SRS ports. For example, for a second SRS port (e.g., the ith SRS port), the cyclic shift is $$\alpha_{i,l} = \alpha_{0,l} + \frac{2\pi i}{N_{ap}^{SRS}}.$$

The UE 720 may then proceed with performing cyclic shift hopping for SRSs based at least in part on the configuration. As shown by reference number 830, the UE 720 may perform a cyclic shift for a first SRS based at least in part on the configuration. As shown by reference number 835, the UE 720 may transmit the first SRS on a first OFDM symbols. As shown by reference number 840, the UE 720 may perform a cyclic shift with a hop for a second SRS on a second OFDM symbol based at least in part on the configuration. As shown by reference number 845, the UE 720 may transmit the second SRS on the second OFDM symbol. By performing cyclic shift hopping for SRS transmissions, the network entity 710 and the UE 720 may better avoid SRS interference and conserve processing resources and signaling resources.

Alternatively, the network entity 710 may transmit a configuration that disables cyclic shift hopping for the SRS resource or the SRS resource set.

As indicated above, FIG. 8 is provided as an example. Other examples may differ from what is described with respect to FIG. 8.

Figure 9:
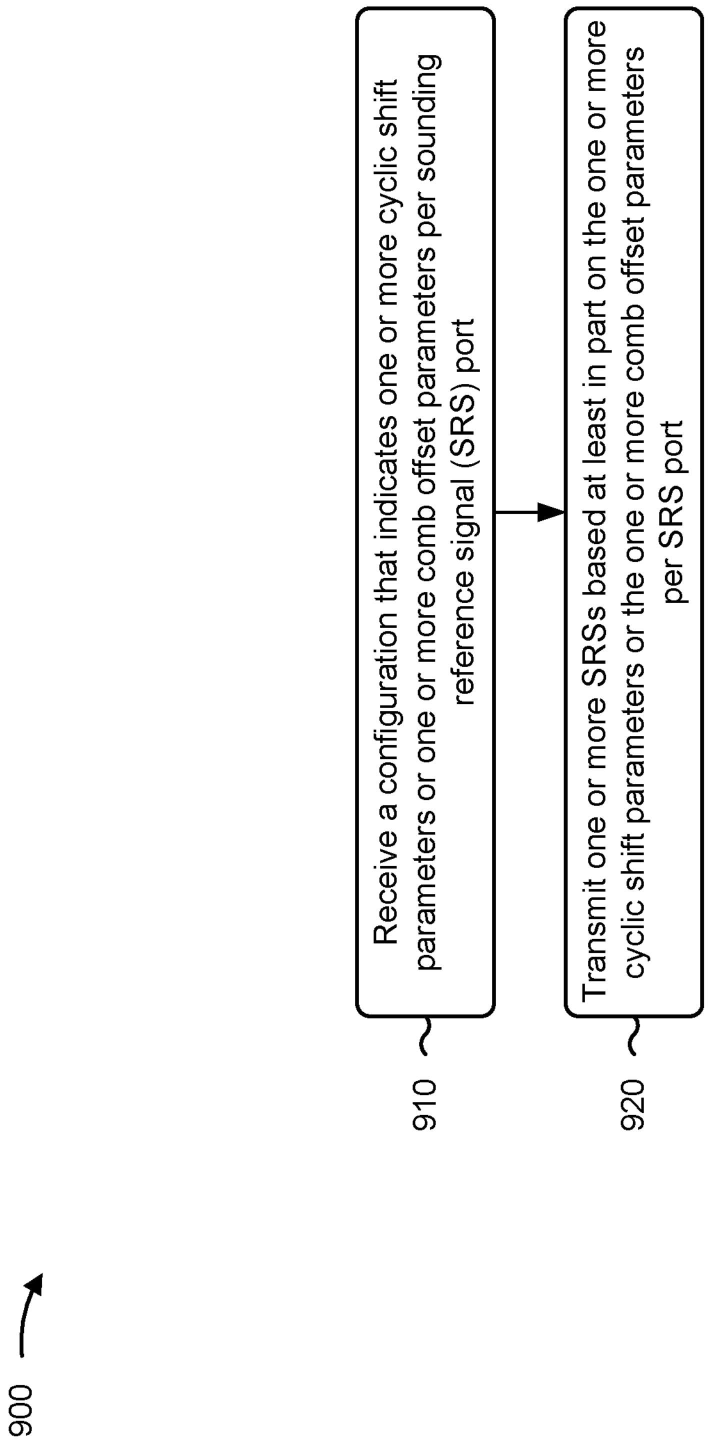
FIG. 9 is a diagram illustrating an example process performed, for example, by a UE, in accordance with the present disclosure.

FIG. 9 is a diagram illustrating an example process 900 performed, for example, by a UE, in accordance with the present disclosure. Example process 900 is an example where the UE (e.g., a UE 120, UE 720) performs operations associated with cyclic shifting for SRS ports.

As shown in FIG. 9, in some aspects, process 900 may include receiving a configuration that indicates one or more cyclic shift parameters or one or more comb offset parameters per SRS port (block 910). For example, the UE (e.g., using communication manager 1308 and/or reception component 1302 depicted in FIG. 13) may receive a configuration that indicates one or more cyclic shift parameters or one or more comb offset parameters per SRS port, as described above.

As further shown in FIG. 9, in some aspects, process 900 may include transmitting one or more SRSs based at least in part on the one or more cyclic shift parameters or the one or more comb offset parameters per SRS port (block 920). For example, the UE (e.g., using communication manager 1308 and/or transmission component 1304 depicted in FIG. 13) may transmit one or more SRSs based at least in part on the one or more cyclic shift parameters or the one or more comb offset parameters per SRS port, as described above.

Process 900 may include additional aspects, such as any single aspect or any combination of aspects described below and/or in connection with one or more other processes described elsewhere herein.

In a first aspect, the one or more cyclic shift parameters per SRS port include antenna port cyclic shift values corresponding to each of multiple SRS ports.

In a second aspect, alone or in combination with the first aspect, the configuration indicates a value for a cyclic shift spacing across consecutive SRS ports.

In a third aspect, alone or in combination with one or more of the first and second aspects, cycling shift values associated with the cyclic shift spacing are sequential.

In a fourth aspect, alone or in combination with one or more of the first through third aspects, the one or more comb offset parameters per SRS port are for an SRS resource with multiple SRS ports.

In a fifth aspect, alone or in combination with one or more of the first through fourth aspects, the configuration indicates a comb offset spacing across consecutive SRS ports.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
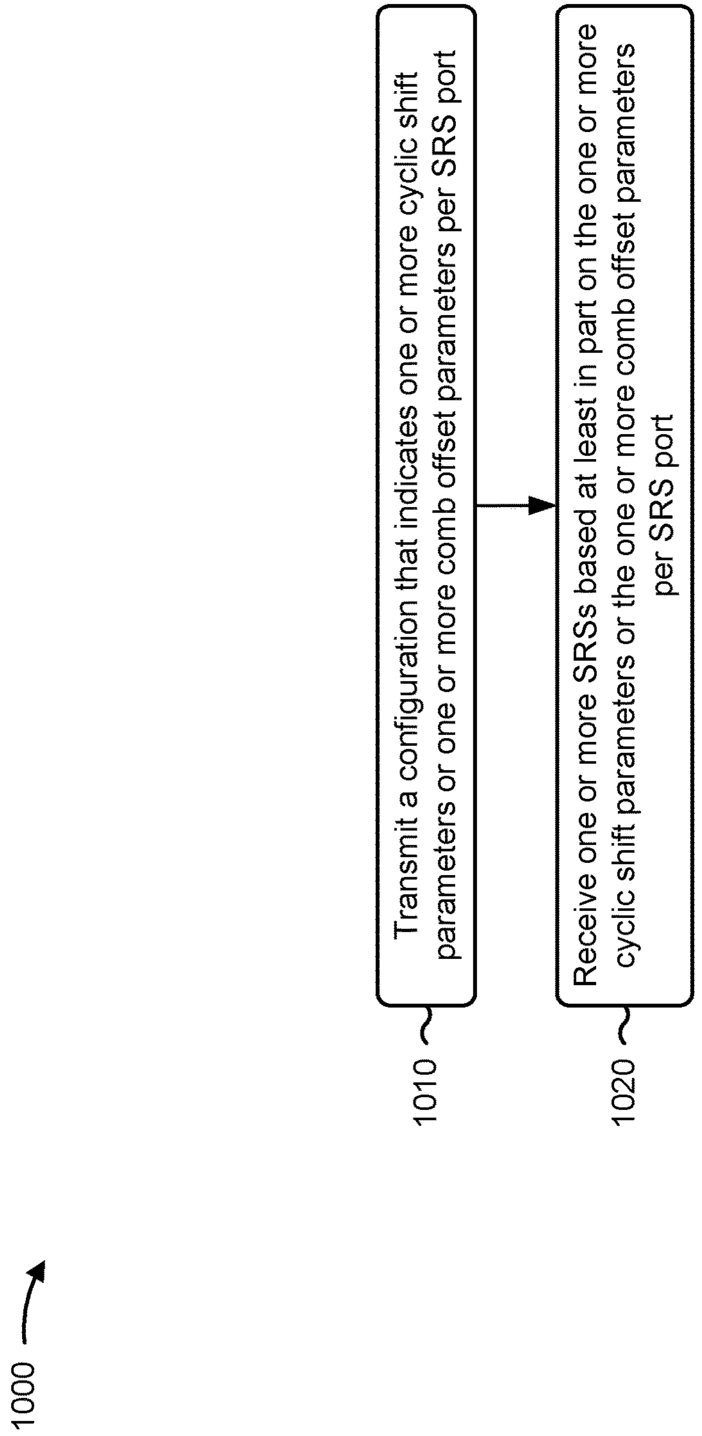
FIG. 10 is a diagram illustrating an example process performed, for example, by a network entity, in accordance with the present disclosure.

FIG. 10 is a diagram illustrating an example process 1000 performed, for example, by a network entity, in accordance with the present disclosure. Example process 1000 is an example where the network entity (e.g., base station 110, network entity 710) performs operations associated with configuring cyclic shifting for SRS ports.

As shown in FIG. 10, in some aspects, process 1000 may include transmitting a configuration that indicates one or more cyclic shift parameters or one or more comb offset parameters per SRS port (block 1010). For example, the network entity (e.g., using communication manager 1408 and/or transmission component 1404 depicted in FIG. 14) may transmit a configuration that indicates one or more cyclic shift parameters or one or more comb offset parameters per SRS port, as described above.

As further shown in FIG. 10, in some aspects, process 1000 may include receiving one or more SRSs based at least in part on the one or more cyclic shift parameters or the one or more comb offset parameters per SRS port (block 1020). For example, the network entity (e.g., using communication manager 1408 and/or reception component 1402 depicted in FIG. 14) may receive one or more SRSs based at least in part on the one or more cyclic shift parameters or the one or more comb offset parameters per SRS port, as described above.

Process 1000 may include additional aspects, such as any single aspect or any combination of aspects described below and/or in connection with one or more other processes described elsewhere herein.

In a first aspect, the one or more cyclic shift parameters per SRS port include antenna port cyclic shift values corresponding to each of multiple SRS ports.

In a second aspect, alone or in combination with the first aspect, the configuration indicates a value for a cyclic shift spacing across consecutive SRS ports.

In a third aspect, alone or in combination with one or more of the first and second aspects, the cyclic shift spacing is sequential.

In a fourth aspect, alone or in combination with one or more of the first through third aspects, the one or more comb offset parameters per SRS port are for an SRS resource with multiple SRS ports.

In a fifth aspect, alone or in combination with one or more of the first through fourth aspects, the configuration indicates a comb offset spacing across consecutive SRS ports.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
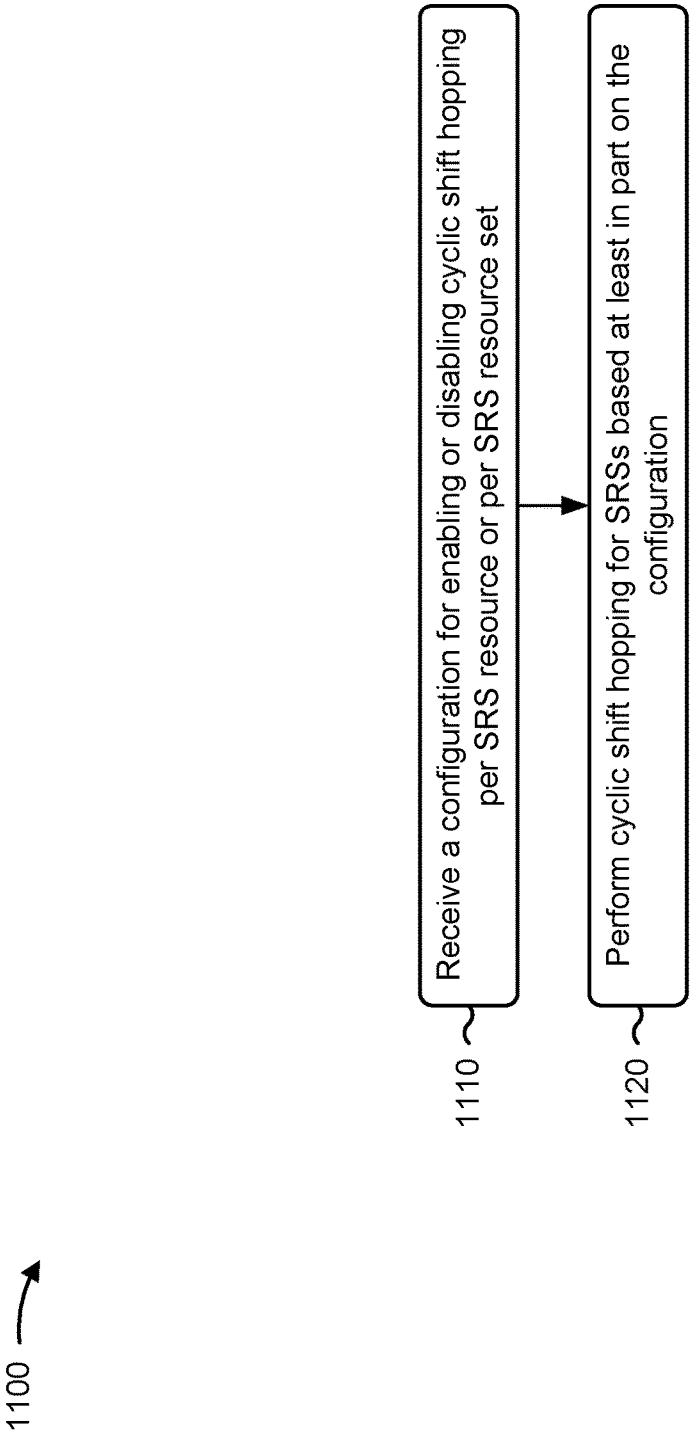
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., a UE 120, UE 720) performs operations associated with cyclic shift hopping for SRS.

As shown in FIG. 11, in some aspects, process 1100 may include receiving a configuration for enabling or disabling cyclic shift hopping per SRS resource or per SRS resource set (block 1110). For example, the UE (e.g., using communication manager 1308 and/or reception component 1302 depicted in FIG. 13) may receive a configuration for enabling or disabling cyclic shift hopping per SRS resource or per SRS resource set, as described above.

As further shown in FIG. 11, in some aspects, process 1100 may include performing cyclic shift hopping for SRSs based at least in part on the configuration (block 1120). For example, the UE (e.g., using communication manager 1308 and/or hopping component 1310 depicted in FIG. 13) may perform cyclic shift hopping for SRSs based at least in part on the configuration, as described above.

Process 1100 may include additional aspects, such as any single aspect or any combination of aspects described below and/or in connection with one or more other processes described elsewhere herein.

In a first aspect, performing cyclic shift hopping includes using a cyclic shift configuration to apply an offset for the cyclic shift hopping.

In a second aspect, alone or in combination with the first aspect, process 1100 includes determining a cyclic shift for a first SRS port based at least in part on a symbol number, a slot number within a radio frame, the cyclic shift configuration, a maximum quantity of cyclic shifts as a function of comb spacing, and a pseudo-random sequence.

In a third aspect, alone or in combination with one or more of the first and second aspects, process 1100 includes determining a cyclic shift for a second SRS port based at least in part on the cyclic shift for the first SRS port and a distribution among SRS ports.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
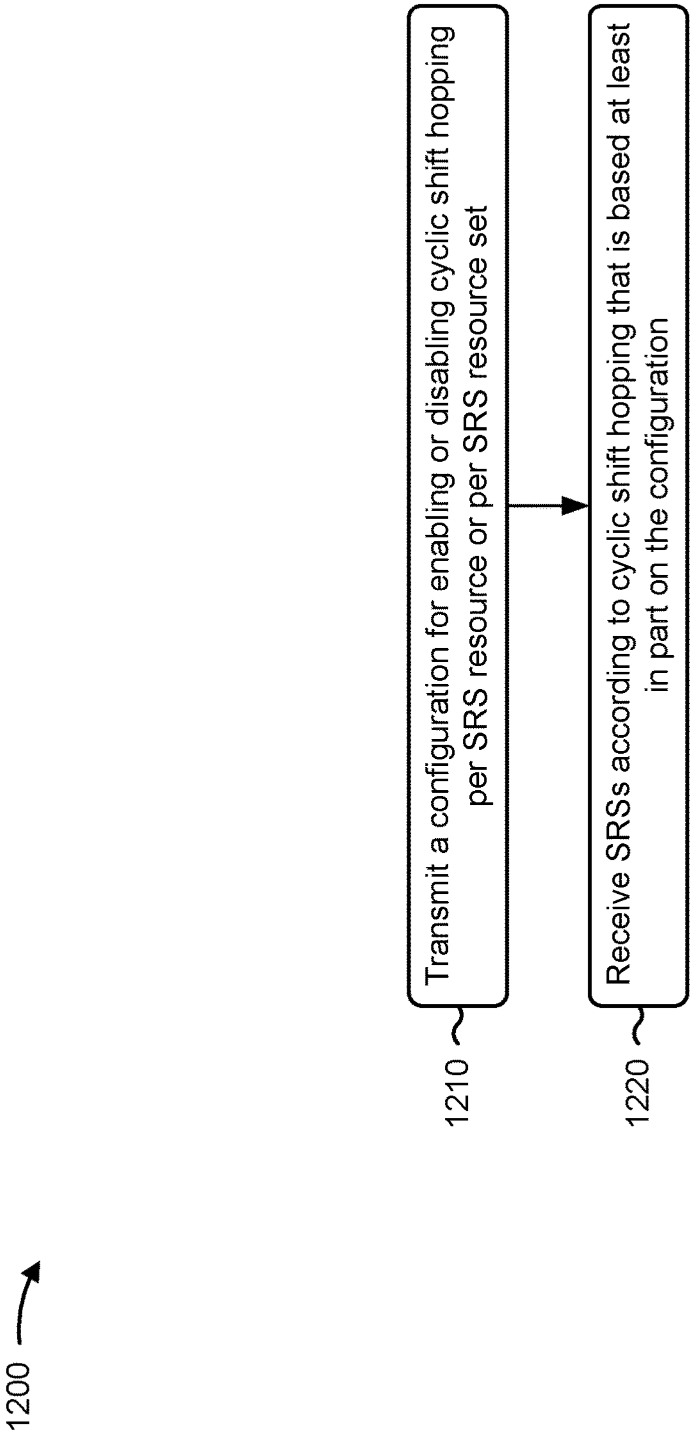
FIG. 12 is a diagram illustrating an example process performed, for example, by a network entity, in accordance with the present disclosure.

FIG. 12 is a diagram illustrating an example process 1200 performed, for example, by a network entity, in accordance with the present disclosure. Example process 1200 is an example where the network entity (e.g., base station 110, network entity 710) performs operations associated with configuring cyclic shift hopping for SRS.

As shown in FIG. 12, in some aspects, process 1200 may include transmitting a configuration for enabling or disabling cyclic shift hopping per SRS resource or per SRS resource set (block 1210). For example, the network entity (e.g., using communication manager 1408 and/or transmission component 1404 depicted in FIG. 14) may transmit a configuration for enabling or disabling cyclic shift hopping per SRS resource or per SRS resource set, as described above.

As further shown in FIG. 12, in some aspects, process 1200 may include receiving SRSs according to cyclic shift hopping that is based at least in part on the configuration (block 1220). For example, the network entity (e.g., using communication manager 1408 and/or reception component 1402 depicted in FIG. 14) may receive SRSs according to cyclic shift hopping that is based at least in part on the configuration, as described above.

Process 1200 may include additional aspects, such as any single aspect or any combination of aspects described below and/or in connection with one or more other processes described elsewhere herein.

In a first aspect, the cyclic shift hopping uses a cyclic shift configuration to apply an offset for the cyclic shift hopping.

In a second aspect, alone or in combination with the first aspect, process 1200 includes determining a cyclic shift for a first SRS port based at least in part on a symbol number, a slot number within a radio frame, the cyclic shift configuration, a maximum quantity of cyclic shifts as a function of comb spacing, and a pseudo-random sequence.

In a third aspect, alone or in combination with one or more of the first and second aspects, process 1200 includes determining a cyclic shift for a second SRS port based at least in part on the cyclic shift for the first SRS port and a distribution among SRS ports.

In a fourth aspect, alone or in combination with one or more of the first through third aspects, receiving the SRSs includes receiving the SRSs according to the cyclic shift for the first SRS port and the cyclic shift for the second SRS port.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
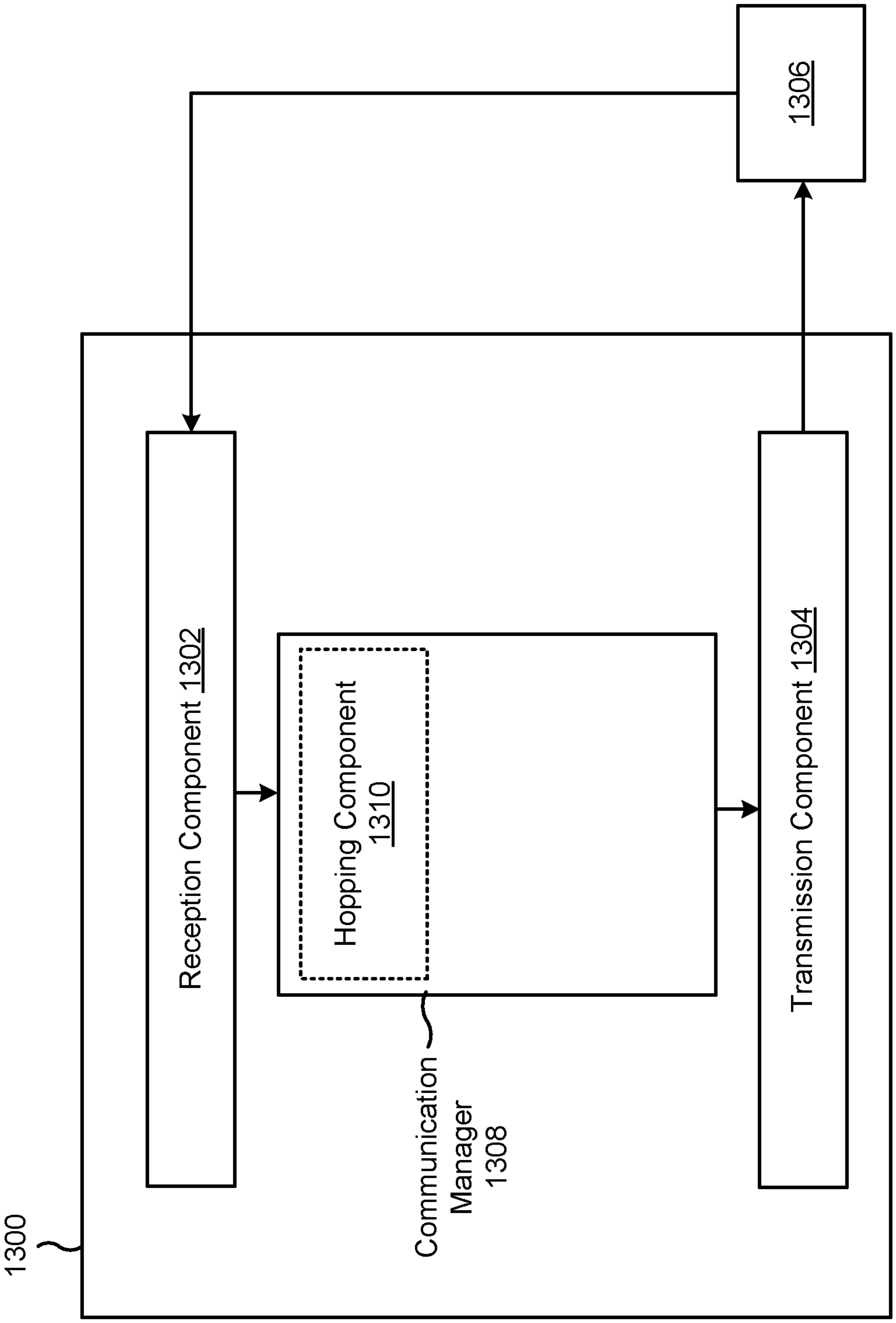
FIGS. 13-14 are diagrams of example apparatuses for wireless communication, in accordance with the present disclosure.

FIG. 13 is a diagram of an example apparatus 1300 for wireless communication. The apparatus 1300 may be a UE (e.g., a UE 120, UE 720), or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 1308. The communication manager 1308 may control and/or otherwise manage one or more operations of the reception component 1302 and/or the transmission component 1304. In some aspects, the communication manager 1308 may include one or more antennas, a modem, a controller/processor, a memory, or a combination thereof, of the UE described in connection with FIG. 2. The communication manager 1308 may be, or be similar to, the communication manager 150 depicted in FIGS. 1 and 2. For example, in some aspects, the communication manager 1308 may be configured to perform one or more of the functions described as being performed by the communication manager 150. In some aspects, the communication manager 1308 may include the reception component 1302 and/or the transmission component 1304. The communication manager 1308 may include a hopping component 1310, among other examples.

In some aspects, the apparatus 1300 may be configured to perform one or more operations described herein in connection with FIGS. 1-8. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

In some aspects, the reception component 1302 may receive a configuration that indicates one or more cyclic shift parameters or one or more comb offset parameters per SRS port. The transmission component 1304 may transmit one or more SRSs based at least in part on the one or more cyclic shift parameters or the one or more comb offset parameters per SRS port.

In some aspects, the reception component 1302 may receive a configuration for enabling or disabling cyclic shift hopping per SRS resource or per SRS resource set.

The hopping component 1310 may perform cyclic shift hopping for SRSs based at least in part on the configuration. The hopping component 1310 may determine a cyclic shift for a first SRS port based at least in part on a symbol number, a slot number within a radio frame, the cyclic shift configuration, a maximum quantity of cyclic shifts as a function of comb spacing, and a pseudo-random sequence. The hopping component 1310 may determine a cyclic shift for a second SRS port based at least in part on the cyclic shift for the first SRS port and a distribution among SRS ports.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
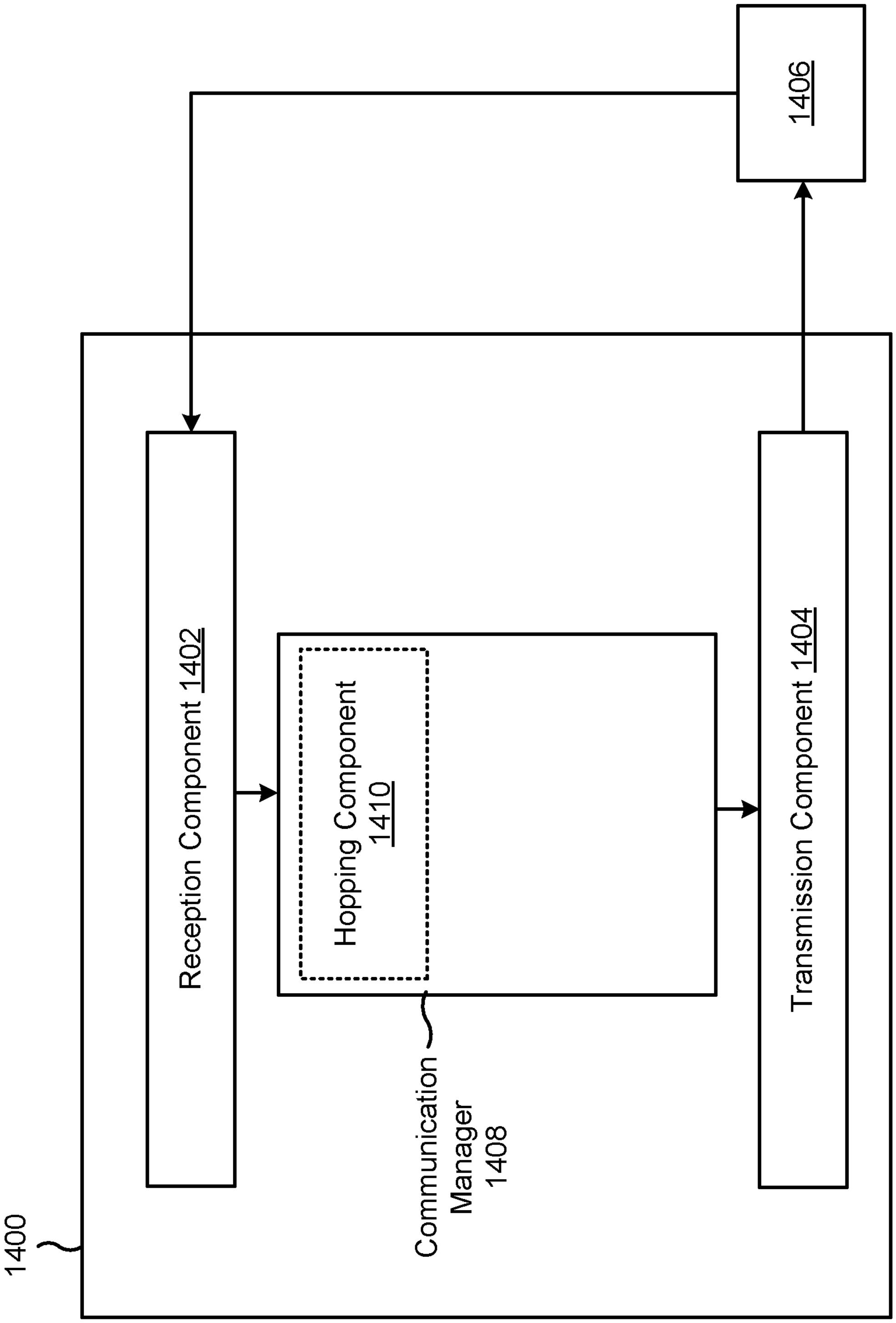

FIG. 14 is a diagram of an example apparatus 1400 for wireless communication. The apparatus 1400 may be a network entity (e.g., base station 110, network entity 710), or a network entity may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 1408. The communication manager 1408 may control and/or otherwise manage one or more operations of the reception component 1402 and/or the transmission component 1404. In some aspects, the communication manager 1408 may include one or more antennas, a modem, a controller/processor, a memory, or a combination thereof, of the network entity described in connection with FIG. 2. The communication manager 1408 may be, or be similar to, the communication manager 150 depicted in FIGS. 1 and 2. For example, in some aspects, the communication manager 1408 may be configured to perform one or more of the functions described as being performed by the communication manager 150. In some aspects, the communication manager 1408 may include the reception component 1402 and/or the transmission component 1404. The communication manager 1408 may include a hopping component 1410, among other examples.

In some aspects, the apparatus 1400 may be configured to perform one or more operations described herein in connection with FIGS. 1-8. Additionally, or alternatively, the apparatus 1400 may be configured to perform one or more processes described herein, such as process 1000 of FIG. 10, process 1200 of FIG. 12, or a combination thereof. In some aspects, the apparatus 1400 and/or one or more components shown in FIG. 14 may include one or more components of the network entity described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network entity described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network entity described in connection with FIG. 2. In some aspects, the transmission component 1404 may be co-located with the reception component 1402 in a transceiver.

The transmission component 1404 may transmit a configuration that indicates one or more cyclic shift parameters or one or more comb offset parameters per SRS port. The reception component 1402 may receive one or more SRSs based at least in part on the one or more cyclic shift parameters or the one or more comb offset parameters per SRS port.

The transmission component 1404 may transmit a configuration for enabling or disabling cyclic shift hopping per SRS resource or per SRS resource set. The reception component 1402 may receive SRSs according to cyclic shift hopping that is based at least in part on the configuration.

The hopping component 1410 may determine a cyclic shift for a first SRS port based at least in part on a symbol number, a slot number within a radio frame, the cyclic shift configuration, a maximum quantity of cyclic shifts as a function of comb spacing, and a pseudo-random sequence. The hopping component 1410 may determine a cyclic shift for a second SRS port based at least in part on the cyclic shift for the first SRS port and a distribution among SRS ports.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

The following provides an overview of some Aspects of the present disclosure:

Aspect 1: A method of wireless communication performed by a user equipment (UE), comprising: receiving a configuration that indicates one or more cyclic shift parameters or one or more comb offset parameters per sounding reference signal (SRS) port; and transmitting one or more SRSs based at least in part on the one or more cyclic shift parameters or the one or more comb offset parameters per SRS port.

Aspect 2: The method of Aspect 1, wherein the one or more cyclic shift parameters per SRS port include antenna port cyclic shift values corresponding to each of multiple SRS ports.

Aspect 3: The method of Aspect 1 or 2, wherein the configuration indicates a value for a cyclic shift spacing across consecutive SRS ports.

Aspect 4: The method of Aspect 3, wherein cycling shift values associated with the cyclic shift spacing are sequential.

Aspect 5: The method of any of Aspects 1-4, wherein the one or more comb offset parameters per SRS port are for an SRS resource with multiple SRS ports.

Aspect 6: The method of Aspect 5, wherein the configuration indicates a comb offset spacing across consecutive SRS ports.

Aspect 7: A method of wireless communication performed by a network entity, comprising: transmitting a configuration that indicates one or more cyclic shift parameters or one or more comb offset parameters per sounding reference signal (SRS) port; and receiving one or more SRSs based at least in part on the one or more cyclic shift parameters or the one or more comb offset parameters per SRS port.

Aspect 8: The method of Aspect 7, wherein the one or more cyclic shift parameters per SRS port include antenna port cyclic shift values corresponding to each of multiple SRS ports.

Aspect 9: The method of Aspect 7 or 8, wherein the configuration indicates a value for a cyclic shift spacing across consecutive SRS ports.

Aspect 10: The method of Aspect 9, wherein the cyclic shift spacing is sequential.

Aspect 11: The method of any of Aspects 7-10, wherein the one or more comb offset parameters per SRS port are for an SRS resource with multiple SRS ports.

Aspect 12: The method of Aspect 11, wherein the configuration indicates a comb offset spacing across consecutive SRS ports.

Aspect 13: A method of wireless communication performed by a user equipment (UE), comprising: receiving a configuration for enabling or disabling cyclic shift hopping per sounding reference signal (SRS) resource or per SRS resource set; and performing cyclic shift hopping for SRSs based at least in part on the configuration.

Aspect 14: The method of Aspect 13, wherein performing cyclic shift hopping includes using a cyclic shift configuration to apply an offset for the cyclic shift hopping.

Aspect 15: The method of Aspect 14, further comprising determining a cyclic shift for a first SRS port based at least in part on a symbol number, a slot number within a radio frame, the cyclic shift configuration, a maximum quantity of cyclic shifts as a function of comb spacing, and a pseudo-random sequence.

Aspect 16: The method of Aspect 15, further comprising determining a cyclic shift for a second SRS port based at least in part on the cyclic shift for the first SRS port and a distribution among SRS ports.

Aspect 17: A method of wireless communication performed by a network entity, comprising: transmitting a configuration for enabling or disabling cyclic shift hopping per sounding reference signal (SRS) resource or per SRS resource set; and receiving SRSs according to cyclic shift hopping that is based at least in part on the configuration.

Aspect 18: The method of Aspect 17, wherein the cyclic shift hopping uses a cyclic shift configuration to apply an offset for the cyclic shift hopping.

Aspect 19: The method of Aspect 18, further comprising determining a cyclic shift for a first SRS port based at least in part on a symbol number, a slot number within a radio frame, the cyclic shift configuration, a maximum quantity of cyclic shifts as a function of comb spacing, and a pseudo-random sequence.

Aspect 20: The method of Aspect 19, further comprising determining a cyclic shift for a second SRS port based at least in part on the cyclic shift for the first SRS port and a distribution among SRS ports.

Aspect 21: The method of Aspect 20, wherein receiving the SRSs includes receiving the SRSs according to the cyclic shift for the first SRS port and the cyclic shift for the second SRS port.

Aspect 22: An apparatus for wireless communication at a device, comprising a processor; memory coupled with the processor; and instructions stored in the memory and executable by the processor to cause the apparatus to perform the method of one or more of Aspects 1-21.

Aspect 23: A device for wireless communication, comprising a memory and one or more processors coupled to the memory, the one or more processors configured to perform the method of one or more of Aspects 1-21.

Aspect 24: An apparatus for wireless communication, comprising at least one means for performing the method of one or more of Aspects 1-21.

Aspect 25: A non-transitory computer-readable medium storing code for wireless communication, the code comprising instructions executable by a processor to perform the method of one or more of Aspects 1-21.

Aspect 26: A non-transitory computer-readable medium storing a set of instructions for wireless communication, the set of instructions comprising one or more instructions that, when executed by one or more processors of a device, cause the device to perform the method of one or more of Aspects 1-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
- one or more memories; and
- one or more processors, coupled to the one or more memories, configured to:
  - receive a configuration that indicates one or more cyclic shift parameters or one or more comb offset parameters per sounding reference signal (SRS) port of multiple SRS ports, wherein the multiple SRS ports are configured individually based at least in part on the configuration;
  - determine a cyclic shift for a first SRS port of the multiple SRS ports based at least in part on a symbol number, a slot number within a radio frame, the configuration, a maximum quantity of cyclic shifts as a function of comb spacing, and a pseudo-random sequence; and
  - transmit one or more SRSs based at least in part on the one or more cyclic shift parameters or the one or more comb offset parameters per SRS port.

2. The UE of claim 1, wherein the one or more cyclic shift parameters per SRS port include antenna port cyclic shift values corresponding to each of the multiple SRS ports.

3. The UE of claim 1, wherein the configuration indicates a value for a cyclic shift spacing across consecutive SRS ports.

4. The UE of claim 3, wherein cycling shift values associated with the cyclic shift spacing are sequential.

5. The UE of claim 1, wherein the one or more comb offset parameters per SRS port are for an SRS resource with multiple SRS ports.

6. The UE of claim 5, wherein the configuration indicates a comb offset spacing across consecutive SRS ports.

7. A network entity for wireless communication, comprising:
- one or more memories; and
- one or more processors, coupled to the one or more memories, configured to:
  - transmit a configuration that indicates one or more cyclic shift parameters or one or more comb offset parameters per sounding reference signal (SRS) port of multiple SRS ports, wherein the multiple SRS ports are configured individually based at least in part on the configuration;
  - determine a cyclic shift for a first SRS port of the multiple SRS ports based at least in part on a symbol number, a slot number within a radio frame, the configuration, a maximum quantity of cyclic shifts as a function of comb spacing, and a pseudo-random sequence; and
  - receive one or more SRSs based at least in part on the one or more cyclic shift parameters or the one or more comb offset parameters per SRS port.

8. The network entity of claim 7, wherein the one or more cyclic shift parameters per SRS port include antenna port cyclic shift values corresponding to each of the multiple SRS ports.

9. The network entity of claim 7, wherein the configuration indicates a value for a cyclic shift spacing across consecutive SRS ports.

10. The network entity of claim 9, wherein the cyclic shift spacing is sequential.

11. The network entity of claim 7, wherein the one or more comb offset parameters per SRS port are for an SRS resource with multiple SRS ports.

12. The network entity of claim 11, wherein the configuration indicates a comb offset spacing across consecutive SRS ports.

13. A user equipment (UE) for wireless communication, comprising:
- one or more memories; and
- one or more processors, coupled to the one or more memories, configured to:
  - receive a configuration for enabling or disabling cyclic shift hopping per sounding reference signal (SRS) resource or per SRS resource set;
  - determine a cyclic shift for a first SRS port based at least in part on a symbol number, a slot number within a radio frame, a cyclic shift configuration, a maximum quantity of cyclic shifts as a function of comb spacing, and a pseudo-random sequence; and
  - perform, using the cyclic shift configuration to apply an offset, cyclic shift hopping for SRSs based at least in part on the configuration.

14. The UE of claim 13, wherein the one or more processors are configured to determine a cyclic shift for a second SRS port based at least in part on the cyclic shift for the first SRS port and a distribution among SRS ports.

15. A network entity for wireless communication, comprising:

one or more memories; and one or more processors, coupled to the one or more memories, configured to:

transmit a configuration for enabling or disabling cyclic shift hopping per sounding reference signal (SRS) resource or per SRS resource set;

determine a cyclic shift for a first SRS port based at least in part on a symbol number, a slot number within a radio frame, a cyclic shift configuration, a maximum quantity of cyclic shifts as a function of comb spacing, and a pseudo-random sequence; and receive SRSs according to cyclic shift hopping that uses the cyclic shift configuration to apply an offset for the cyclic shift hopping and is based at least in part on the configuration.

16. The network entity of claim 15, wherein the one or more processors are configured to determine a cyclic shift for a second SRS port based at least in part on the cyclic shift for the first SRS port and a distribution among SRS ports.

17. The network entity of claim 16, wherein the one or more processors, to receive the SRSs, are configured to receive the SRSs according to the cyclic shift for the first SRS port and the cyclic shift for the second SRS port.

* * * * *